(12) United States Patent
Kamikozawa

(10) Patent No.: US 10,473,070 B2
(45) Date of Patent: Nov. 12, 2019

(54) FUEL TANK SYSTEM

(71) Applicant: TOYOTA JIDOSHA KABUSHIKI KAISHA, Toyota-shi, Aichi-ken (JP)

(72) Inventor: Takahiro Kamikozawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 15/837,538

(22) Filed: Dec. 11, 2017

(65) Prior Publication Data

US 2018/0180001 A1 Jun. 28, 2018

(30) Foreign Application Priority Data

Dec. 26, 2016 (JP) ................. 2016-251935

(51) Int. Cl.
| | |
|---|---|
| *F02M 37/04* | (2006.01) |
| *F02M 37/00* | (2006.01) |
| *F02M 37/02* | (2006.01) |
| *F02M 25/08* | (2006.01) |
| *B60K 15/03* | (2006.01) |
| *B60K 15/035* | (2006.01) |

(52) U.S. Cl.
CPC ...... *F02M 37/0052* (2013.01); *F02M 25/089* (2013.01); *F02M 37/0088* (2013.01); *F02M 37/025* (2013.01); *B60K 2015/0325* (2013.01); *B60K 2015/03118* (2013.01); *B60K 2015/03131* (2013.01); *B60K 2015/03138* (2013.01); *B60K 2015/03144* (2013.01); *B60K 2015/03289* (2013.01); *B60K 2015/03514* (2013.01); *B60K 2015/03576* (2013.01); *F02M 25/0854* (2013.01); *F02M 25/0872* (2013.01); *F02M 37/007* (2013.01); *F02M 2025/0863* (2013.01)

(58) Field of Classification Search
CPC .......... F02M 37/0029; F02M 37/0052; F02M 47/027; F02M 25/0836; F02M 33/08; F02M 37/0023; F02D 19/0621; F02D 41/0032
USPC ................ 123/495, 506, 509, 514, 516, 520
See application file for complete search history.

(56) References Cited

U.S. PATENT DOCUMENTS

| | | | |
|---|---|---|---|
| 5,983,932 A | 11/1999 | Wagner et al. | |
| 9,394,866 B2 | 7/2016 | Fisher et al. | |
| 2011/0168931 A1* | 7/2011 | Sugiura | F16K 1/443 251/129.15 |
| 2013/0340890 A1 | 12/2013 | Matsu et al. | |
| 2016/0186697 A1* | 6/2016 | Tsuzuki | F02M 25/0836 123/519 |

(Continued)

FOREIGN PATENT DOCUMENTS

| | | |
|---|---|---|
| JP | 2008-30642 A | 2/2008 |
| WO | 2012/124410 A1 | 9/2012 |

*Primary Examiner* — John Kwon
(74) *Attorney, Agent, or Firm* — Oliff PLC

(57) ABSTRACT

A fuel tank system is provided. In the main tank of the system, the end of a communication pipe is located above the end of a fuel introduction pipe inserted into the main tank. The end of a first pressure relief pipe at which a first cut-off valve is provided is located above the end of the communication pipe. In the auxiliary tank, the end of the communication pipe is located above the end of the fuel introduction pipe inserted into the auxiliary tank. In the auxiliary tank, the end of a second pressure relief pipe at which a second cut-off valve is provided is located above an end of a scavenging pipe.

8 Claims, 6 Drawing Sheets

(56) References Cited

U.S. PATENT DOCUMENTS

2016/0298568 A1* 10/2016 Giroud .................... F02D 41/38
2017/0356394 A1* 12/2017 Murai ................. F02D 41/0045

* cited by examiner

FUEL TANK SYSTEM

BACKGROUND OF THE INVENTION

The present invention relates to a fuel tank system including a plurality of tanks.

U.S. Pat. No. 5,983,932 discloses a fuel tank system equipped with an onboard refueling vapor recovery (ORVR) system. An ORVR system collects fuel vapor in the tank using a canister by discharging the fuel vapor in the tank through the canister at the time of refueling, thereby limiting the discharge of fuel vapor to the outside.

The fuel tank system is equipped with an auxiliary tank in addition to the main tank, which accommodates a pump for drawing fuel. The fuel tank system has a balance pipe connecting the lower part of the main tank and the lower part of the auxiliary tank. The liquid level of fuel in the auxiliary tank thus changes with changes in the liquid level of fuel in the main tank due to refueling of the main tank and drawing of the fuel from the main tank by the pump. Accordingly, the liquid levels of the tanks are equalized.

In the above-described fuel tank system, the balance pipe is provided so as to traverse the space between the two tanks. Therefore, when the fuel system is installed in a vehicle, it is difficult to arrange the two tanks at positions sandwiching elongated parts such as the exhaust pipe or the propeller shaft, which may make it impossible to employ the fuel system in some cases.

SUMMARY OF THE INVENTION

In accordance with one aspect of the present invention, a fuel tank system is provided that includes a feed pump module, a controller, a main tank, an auxiliary tank, a fuel introduction pipe, a transfer device, a communication pipe, a canister, a scavenging pipe, an ORVR valve, a first pressure relief pipe, a first cut-off valve, a second pressure relief pipe, a second cut-off valve, and a pressure relief control valve. The feed pump module is configured to draw fuel and supply the fuel. The controller is configured to control the feed pump module. The main tank accommodates the feed pump module. The fuel introduction pipe has two branching portions in the middle. The branching portions each have an end. The end of one of the branching portions is inserted into the main tank from above. The end of the other branching portion is inserted into the auxiliary tank from above. The fuel introduction pipe is configured to preferentially introduce fuel to the main tank. The transfer device is configured to draw fuel in the auxiliary tank and transfer the fuel to the main tank. The communication pipe connects the main tank and the auxiliary tank to each other. The communication pipe has an end that is inserted into the main tank from above and an end that is inserted into the auxiliary tank from above. The canister collects fuel vapor. The scavenging pipe connects the canister and the auxiliary tank to each other. The ORVR valve is a float type valve provided at an end of the scavenging pipe located in the auxiliary tank. The ORVR valve is configured to close when a liquid level of fuel reaches the ORVR valve, thereby limiting scavenging of fuel vapor from the auxiliary tank to the canister. The first pressure relief pipe, which branches off from the scavenging pipe and has an end inserted into the main tank. The first pressure relief pipe has a flow resistance of fuel vapor greater than those of the scavenging pipe and the communication pipe. The first cut-off valve is a float type valve provided at the end of the first pressure relief pipe. The first cut-off valve is configured to close when the liquid level of fuel reaches the first cut-off valve. The second pressure relief pipe branches off from the scavenging pipe and has an end inserted into the auxiliary tank. The second pressure relief pipe has a flow resistance of fuel vapor greater than that of the scavenging pipe. The second cut-off valve is a float type valve provided at an end of the second pressure relief pipe. The second cut-off valve is configured to close when the liquid level of fuel reaches the second cut-off valve. The pressure relief control valve is provided in the first pressure relief pipe. The pressure relief control valve is configured to close to limit a flow of fuel vapor through the first pressure relief pipe. In the main tank, the end of the communication pipe is located at a position higher than the end of the fuel introduction pipe inserted into the main tank from above, and the end of the first pressure relief pipe at which the first cut-off valve is provided is located at a position higher than the end of the communication pipe. In the auxiliary tank, the end of the communication pipe is located at a position higher than the end of the fuel introduction pipe inserted into the auxiliary tank. Also, in the auxiliary tank, the end of the second pressure relief pipe at which the second cut-off valve is provided is located at a position higher than an end of the scavenging pipe.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A fuel tank system according to a first embodiment will now be described with reference to FIGS. 1 to 5.

Figure 1:
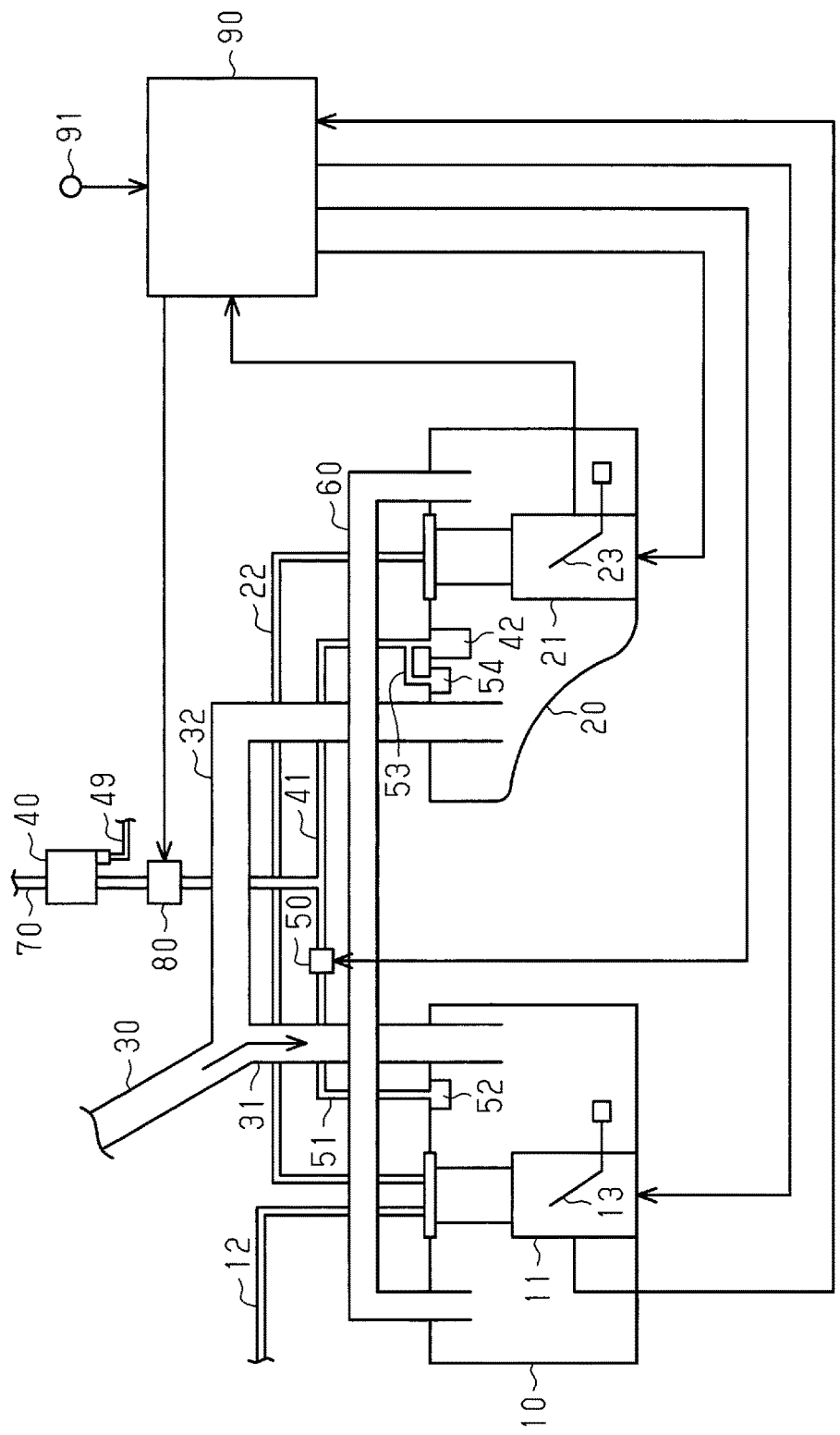
FIG. 1 is a schematic diagram showing the configuration of a fuel tank system according to a first embodiment.

As shown in FIG. 1, this fuel tank system is mounted in a vehicle and has two sealed tanks, specifically, a main tank 10 and an auxiliary tank 20.

The main tank 10 accommodates a feed pump module 11, which draws the fuel in the main tank 10 and supplies it to the internal combustion engine, which is as a fuel demanding portion. A supply pipe 12, which is connected to the internal combustion engine, extends from the feed pump module 11. The fuel drawn by the feed pump module 11 is supplied to the internal combustion engine through the supply pipe 12. The feed pump module 11 incorporates a suction filter and a pressure regulator. When the pressure of the fuel in the supply pipe 12 becomes higher than or equal to the valve opening pressure of the pressure regulator, the pressure regulator opens in the feed pump module 11, and the drawn fuel is discharged within the feed pump module 11. The feed pump module 11 is also provided with a float type fuel sender gauge 13, which detects the remaining amount of fuel in the main tank 10.

The auxiliary tank 20 accommodates a transfer pump module 21, which draws the fuel in the auxiliary tank 20 and transfers it to the main tank 10. A transfer pipe 22 extends from the transfer pump module 21 and is connected to the main tank 10. The fuel drawn by the transfer pump module 21 is transferred to the main tank 10 through the transfer pipe 22. The transfer pump module 21 and the transfer pipe 22 constitute a transfer device, which transfers fuel from the auxiliary tank 20 to the main tank 10. The transfer pump module 21 also incorporates a suction filter and a pressure regulator. The transfer pump module 21 is also provided with a float type fuel sender gauge 23, which detects the remaining amount of fuel in the auxiliary tank 20.

A fuel introduction pipe 30 is inserted into the main tank 10 and the auxiliary tank 20. The fuel introduction pipe 30 branches into a first branch pipe 31 and a second branch pipe 32 in the middle. The first branch pipe 31 is inserted into the main tank 10 from above and the second branch pipe 32 is inserted into the auxiliary tank 20 from above.

The fuel introduction pipe 30 is configured to preferentially introduce the fuel that has been poured through the fuel inlet into the main tank 10. For example, at the part where the first branch pipe 31 and the second branch pipe 32 branch, the first branch pipe 31 extends downward and the second branch pipe 32 extends horizontally as shown in FIG. 1. This makes it easier for the fuel flowing from above to flow into the first branch pipe 31, which extends downward, than into the second branch pipe 32, which extends horizontally.

The fuel tank system includes a canister 40, which collects fuel vapor generated in the main tank 10 and the auxiliary tank 20. The canister 40 and the auxiliary tank 20 are connected to each other by a scavenging pipe 41 and communicate with each other through the scavenging pipe 41. The scavenging pipe 41 is inserted into the auxiliary tank 20 from above, and an ORVR valve 42 is provided at the end of the scavenging pipe 41 located at the auxiliary tank 20.

Figure 2:
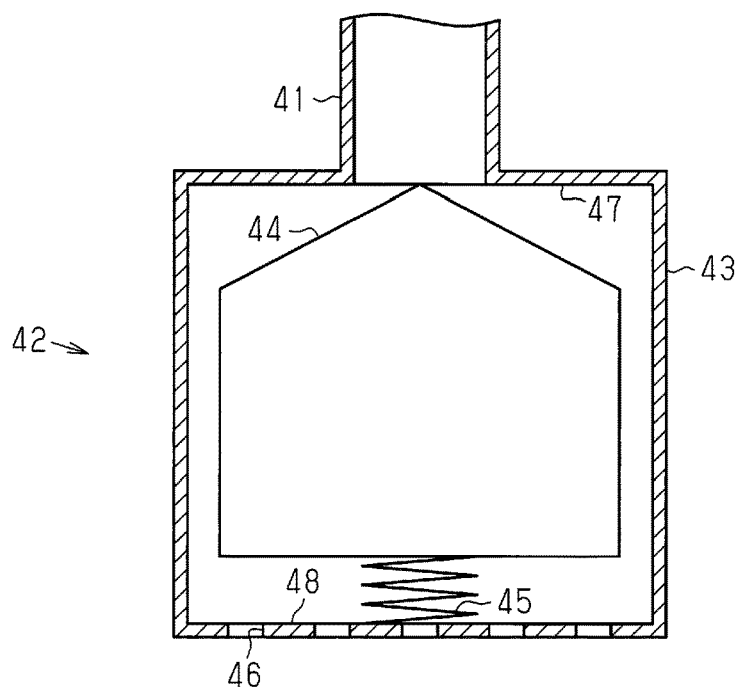
FIG. 2 is a schematic diagram showing the ORVR valve in an open state.

As shown in FIG. 2, the ORVR valve 42 is a float type valve that accommodates a float 44 in a housing 43, which is the end of the scavenging pipe 41. A bottom 48 of the housing 43 has through-holes 46. A spring 45 is arranged between the float 44 and the bottom 48, and the float 44 is urged upward by the spring 45. When the liquid level of fuel is below the ORVR valve 42 as shown in FIG. 2, the float 44 is separated from a ceiling 47 of the housing 43 due to the equilibrium between the mass of the float 44 and the urging force of the spring 45. Therefore, at this time, fuel vapor flows through the clearance between the float 44 and the ceiling 47.

Figure 3:
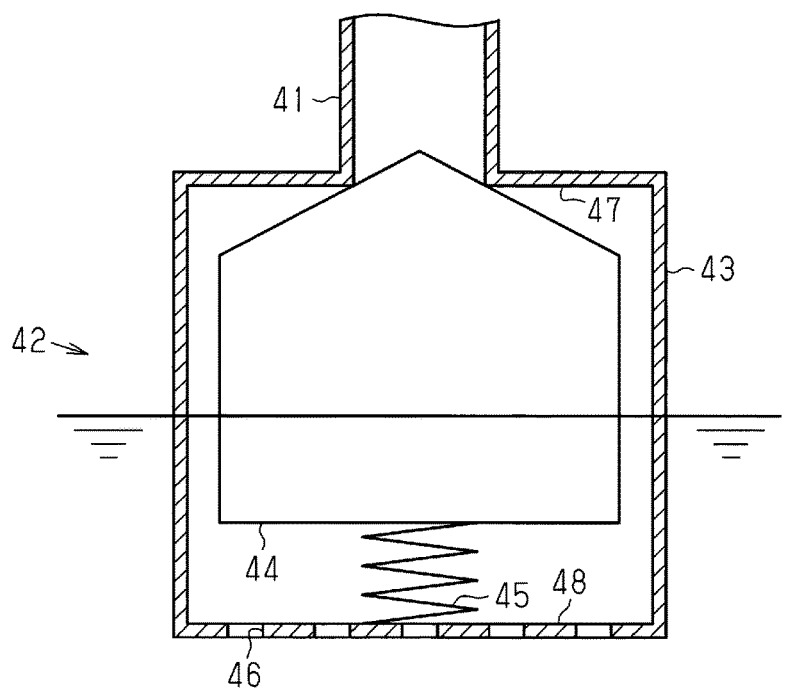
FIG. 3 is a schematic diagram showing the ORVR valve in a closed state.

As shown in FIG. 3, when the liquid level of fuel reaches the ORVR valve 42, the fuel prevents fuel vapor from flowing into the housing 43 through the through-holes 46. Also, due to the buoyancy acting on the float 44, the float 44 contacts the ceiling 47 of the housing 43, thereby closing the ORVR.

When the vehicle is overturned, the mass of the float 44 no longer acts on the spring 45, so that the float 44 is pressed against the ceiling 47 by the urging force of the spring 45. Thus, the ORVR valve 42 also functions as a rollover valve, which is closed when the vehicle is overturned to prevent fuel from leaking out of the auxiliary tank 20.

As shown in FIG. 1, a first pressure relief pipe 51 branches off from the scavenging pipe 41 and is connected to the main tank 10. The first pressure relief pipe 51 is inserted into the main tank 10 from above, and a cut-off valve 52 is provided at the end of the first pressure relief pipe 51 in the main tank 10. The cut-off valve 52 corresponds to a first cut-off valve.

The cut-off valve 52 is a float type valve having the same configuration as the ORVR valve 42. The difference between the cut-off valve 52 and the ORVR valve 42 lies in the size. Specifically, the cut-off valve 52 is smaller than the ORVR valve 42. Therefore, the clearance between the float and the ceiling of the housing at the time of valve opening is also narrow, and the flow resistance of fuel vapor of the first pressure relief pipe 51 is greater than the flow resistance of fuel vapor of the scavenging pipe 41. The cut-off valve 52 also functions as a rollover valve, which is closed when the vehicle is overturned to prevent fuel from leaking out of the main tank 10. The cut-off valve 52 is attached to the ceiling of the main tank 10.

A second pressure relief pipe 53 branches off from a portion of the scavenging pipe 41 that is closer to the auxiliary tank 20 than the portion from which the first pressure relief pipe 51 branches off. The second pressure relief pipe 53 is inserted into the auxiliary tank 20 from above, and a cut-off valve 54 is provided at the end of the second pressure relief pipe 53 in the auxiliary tank 20. The cut-off valve 54 corresponds to a second cut-off valve. The cut-off valve 54 is identical to the cut-off valve 52 provided in the main tank 10. Thus, the flow resistance of fuel vapor of the second pressure relief pipe 53 is greater than the flow resistance of fuel vapor of the scavenging pipe 41. The cut-off valve 54 also functions as a rollover valve, which is closed when the vehicle is overturned to prevent fuel from leaking out of the auxiliary tank 20. Both the cut-off valve 54 and the ORVR valve 42 are attached to the ceiling of the auxiliary tank 20, and the bottom of the housing of the cut-off valve 54 is located at a position higher than the bottom 48 of the housing 43 of the ORVR valve 42.

The first pressure relief pipe 51 and the second pressure relief pipe 53 are provided to secure an outlet of fuel vapor so that the pressure in the main tank 10 and the pressure in the auxiliary tank 20 are not excessively increased.

In addition to the scavenging pipe 41, the canister 40 is connected an intake pipe 49, which takes in air from the outside, and a purge pipe 70, which is connected to the intake passage of the internal combustion engine. The canister 40 accommodates activated carbon that adsorbs fuel vapor. The fuel vapor generated in the main tank 10 and the auxiliary tank 20 including the fuel vapor merged from the main tank 10 and the auxiliary tank 20 through the first pressure relief pipe 51 and the second pressure relief pipe 53 is introduced to the canister 40 through the scavenging pipe 41 and adsorbed by this activated carbon.

The upper parts of the main tank 10 and the auxiliary tank 20 are connected to each other by a communication pipe 60. One end of the communication pipe 60 is inserted into the main tank 10 from above and the other end of the communication pipe 60 is inserted into the auxiliary tank 20 from above. The diameter of the communication pipe 60 is set such that the flow resistance of fuel vapor is less than the flow resistance of fuel vapor of the first pressure relief pipe 51.

The end of the communication pipe 60 inserted into the main tank 10 is located at a position that is higher than the end of the first branch pipe 31 of the fuel introduction pipe 30 inserted into the main tank 10 and lower than the end of the first pressure relief pipe 51 at which the cut-off valve 52 is provided. Therefore, in the main tank 10, the end of the communication pipe 60 is located at a position higher than the end of the fuel introduction pipe 30 inserted into the main tank 10 from above, and the end of the first pressure relief pipe 51 at which the cut-off valve 52 is provided is located at a position higher than the end of the communication pipe 60.

The end of the communication pipe 60 inserted into the auxiliary tank 20 is located at a position that is higher than the end of the second branch pipe 32 of the fuel introduction pipe 30 inserted into the auxiliary tank 20 and at the same height as the end of the scavenging pipe 41 at which the ORVR valve 42 is provided. Therefore, in the auxiliary tank 20, the end of the communication pipe 60 is located at a position higher than the end of the fuel introduction pipe 30 that is inserted into the auxiliary tank 20. The end of the scavenging pipe 41 at which the ORVR valve 42 is provided is located at the same height as the end portion of the communication pipe 60, and the end of the second pressure relief pipe 53 at which the cut-off valve 54 is provided is located at a position higher than the end of the scavenging pipe 41. In the auxiliary tank 20, the end of the communication pipe 60 may be located at a position that is higher or lower than the end of the scavenging pipe 41 at which the ORVR valve 42 is provided.

The fuel tank system includes a pressure relief control valve 50, which is configured to limit the flow of fuel vapor through the first pressure relief pipe 51 by closing the first pressure relief pipe 51. The pressure relief control valve 50 is a normally open electromagnetic valve, which is opened when not energized and is closed when energized to block the first pressure relief pipe 51. Further, a block valve 80 is provided in the scavenging pipe 41. Specifically, the block valve 80 is located at a portion that is closer to the canister 40 than the portion to which the second pressure relief pipe 53 is connected and closer to the canister 40 than the portion to which the first pressure relief pipe 51 is connected. The block valve 80 is configured to be closed to block the scavenging pipe 41. The block valve 80 is also a normally open electromagnetic valve, which is opened when not energized and is closed when energized to block the first pressure relief pipe 51.

The pressure relief control valve 50 and the block valve 80 are controlled by a controller 90. In addition to the control of the pressure relief control valve 50 and the block valve 80, the controller 90 also controls the feed pump module 11 and the transfer pump module 21. The controller 90 is connected to a fuel lid switch 91, which detects the open state of the fuel lid covering the fuel inlet of the fuel introduction pipe 30, and the fuel sender gauges 13, 23.

Next, referring to FIGS. 4 and 5 in addition to FIG. 1, the operation and advantages achieved by the operation of the fuel tank system according to the present embodiment will be described.

When the fuel lid switch 91 detects that the fuel lid is opened at refueling, the controller 90 puts the pressure relief control valve 50 in a closed state. Until the fuel lid is closed, the pressure relief control valve 50 is maintained in a closed state while the block valve 80 is open.

When the fueling nozzle is inserted into the fuel inlet of the fuel introduction pipe 30 and refueling is started, fuel is first conducted to the main tank 10 through the first branch pipe 31 of the fuel introduction pipe 30 as indicated by the arrow in FIG. 1. With the rise of the liquid level of fuel in the main tank 10, the fuel vapor in the main tank 10 is sent to the auxiliary tank 20 through the communication pipe 60. When fuel vapor is introduced into the auxiliary tank 20, the fuel vapor in the auxiliary tank 20 is sent to the canister 40 through the scavenging pipe 41. At this time, since the pressure relief control valve 50 provided in the first pressure relief pipe 51 is closed, fuel vapor is not discharged from the main tank 10 through the first pressure relief pipe 51.

Figure 4:
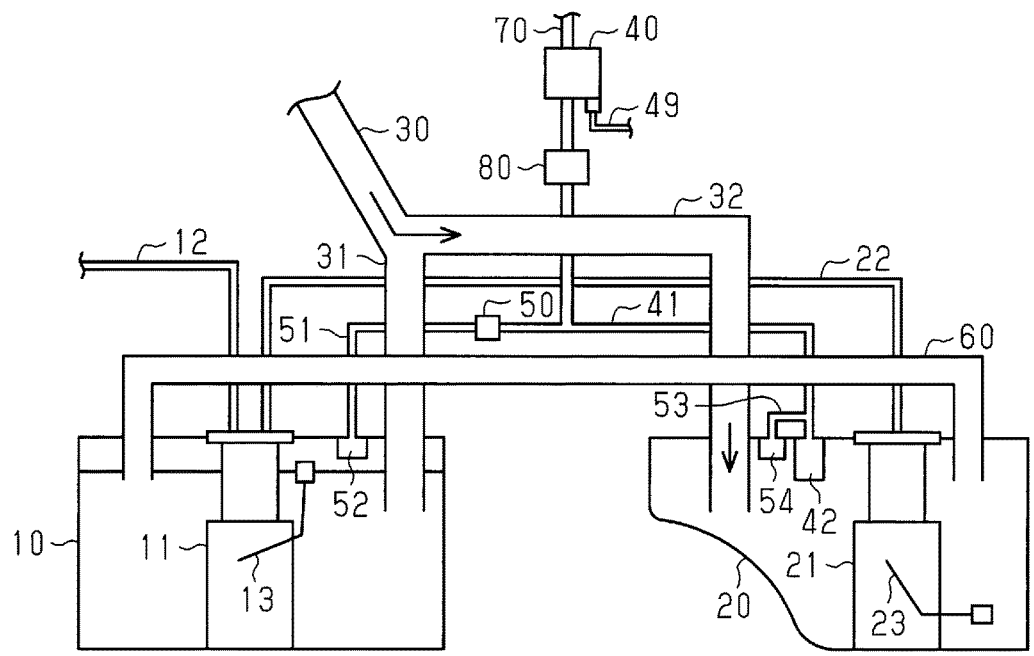
FIG. 4 is a schematic diagram showing the fuel tank system of the first embodiment when the main tank is filled up at the time of refueling.

As the refueling continues, the liquid level of fuel in the main tank 10 reaches the end of the communication pipe 60 in the main tank 10 as shown in FIG. 4. The fuel then blocks the end of the communication pipe 60, so that fuel vapor is no longer discharged from the main tank 10 through the communication pipe 60. Therefore, fuel is unlikely to enter the main tank 10, and the first branch pipe 31 of the fuel introduction pipe 30 is filled with fuel. Thereafter, as indicated by the arrows in FIG. 4, all the fuel is introduced into the auxiliary tank 20.

Then, when refueling of the auxiliary tank 20 is in progress and the liquid level of fuel in the auxiliary tank 20 is rising, the fuel vapor in the auxiliary tank 20 is sent to the canister 40 through the scavenging pipe 41. At this time as well, the pressure relief control valve 50, which is provided in the first pressure relief pipe 51, is closed. For this reason, when refueling of the auxiliary tank 20 is in progress, overfilling of fuel is prevented, which would cause fuel vapor to be discharged from the main tank 10 through the first pressure relief pipe 51 and the liquid level of fuel in the main tank 10 to reach the first pressure relief pipe 51.

Figure 5:
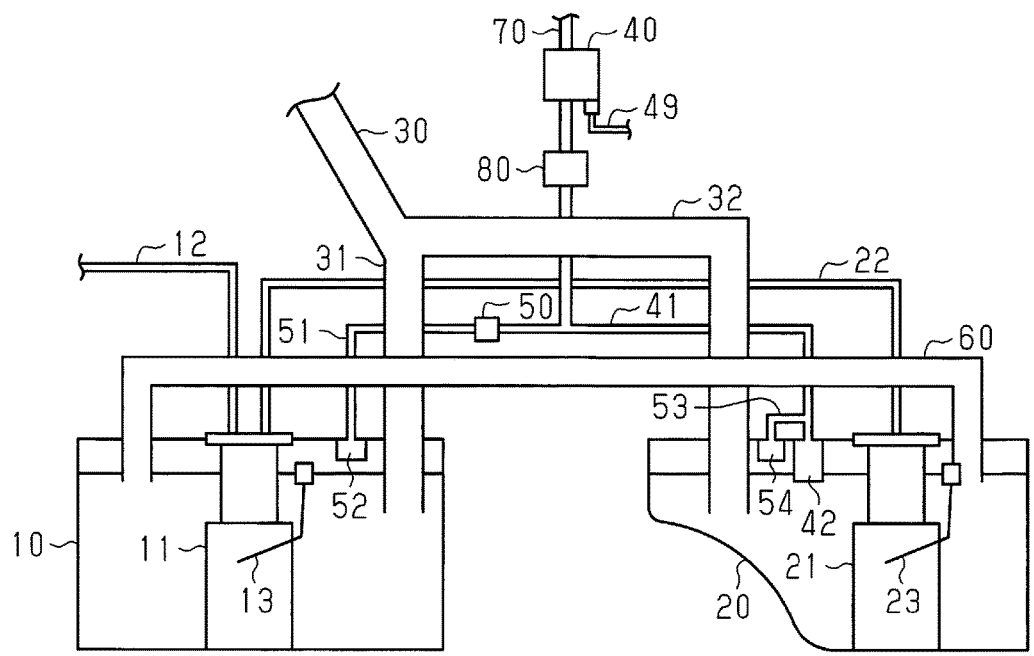
FIG. 5 is a schematic diagram showing the fuel tank system of the first embodiment when the auxiliary tank is filled up at the time of refueling.

As shown in FIG. 5, when the liquid level of fuel in the auxiliary tank 20 reaches the ORVR valve 42, which is provided at the end of the scavenging pipe 41, the ORVR valve 42 is closed. This limits the discharge of fuel vapor through the scavenging pipe 41. That is, when the ORVR valve 42 is closed, the introduction path of fuel vapor to the scavenging pipe 41 is only the second pressure relief pipe 53, of which the flow resistance of fuel vapor is greater than that of the scavenging pipe 41. This significantly limits the discharge of fuel vapor through the scavenging pipe 41. As a result, fuel is unlikely to enter the auxiliary tank 20, and the second branch pipe 32 in the fuel introduction pipe 30 is also filled with fuel. This causes the liquid level in the fuel introduction pipe 30 to rise and reach the fueling nozzle so that the refueling is stopped.

As described above, while avoiding overfilling, the fuel tank system is capable of sending fuel vapor inside the main tank 10 and auxiliary tank 20 to the canister 40 through the scavenging pipe 41 and refueling both the main tank 10 and the auxiliary tank 20 without discharging fuel vapor to the outside.

Further, with this fuel tank system, when the fuel in the main tank 10 is consumed, the transfer pump module 21 is activated to transfer fuel from the auxiliary tank 20 to the main tank 10 through the transfer pipe 22.

Specifically, the controller 90 activates the transfer pump module 21 when the remaining amount of fuel in the main tank 10 detected by the fuel sender gauge 13 becomes less than or equal to a first predetermined amount, which is less than the remaining amount at which the liquid level of fuel in the main tank 10 reaches the end of the communication pipe 60. As a result, the fuel in the auxiliary tank 20 is drawn by the transfer pump module 21 and transferred to the main tank 10 through the transfer pipe 22. The controller 90 stops the transfer pump module 21 when the remaining amount of fuel in the main tank 10 detected by the fuel sender gauge 13 becomes equal to a second predetermined amount, which is greater than the first predetermined amount and is less than or equal to the remaining amount at which the liquid level of fuel reaches the end of the communication pipe 60. That is, in this fuel tank system, each time the remaining amount of fuel in the main tank 10 becomes less than or equal to the first predetermined amount, the transfer pump module 21 is activated to transfer fuel in the auxiliary tank 20 to the main tank 10 until the remaining amount of fuel in the main tank 10 reaches the second predetermined amount, the transfer pump module 21.

As described above, the fuel tank system is provided with the transfer device. Thus, when the fuel in the main tank 10 is consumed, fuel can be transferred from the auxiliary tank 20 to the main tank 10 by the transfer device. Therefore, there is no need to provide a pipe connecting the lower part of the main tank 10 to the lower part of the auxiliary tank 20, like the balance pipe for equalizing the liquid levels of fuel of the main tank 10 and the auxiliary tank 20. Thus, the main tank 10 and the auxiliary tank 20 can be arranged at positions sandwiching an elongated component such as the drive shaft or the exhaust pipe. Thus, the positions of the tanks 10, 20 are unlikely to be restricted by the arrangement of components.

Also, during operation of the internal combustion engine, the fuel tank system draws the outside air into the canister 40 through the intake pipe 49 and desorbs the fuel vapor adsorbed by the activated carbon, thereby performing purging to send the desorbed fuel vapor to the intake passage of the internal combustion engine through the purge pipe 70. During the purging, the controller 90 closes the block valve 80. As a result, purging can be executed in a state in which the canister 40 is disconnected from the main tank 10 and the auxiliary tank 20, so that the fuel vapor adsorbed by the activated carbon of the canister 40 can be desorbed so that the fuel vapor collecting ability is recovered.

The above-described first embodiment achieves the following advantages in addition to the above-described advantages.

(1) By preventing the occurrence of overfilling of fuel, which would cause the liquid level of fuel to reach the first pressure relief pipe 51 at the time of refueling, as described above, the liquid fuel is prevented from passing through the cut-off valve 52 to enter the first pressure relief pipe 51 or the canister 40.

(2) Since the pressure relief control valve 50 is in a closed state before the liquid level of fuel in the main tank 10 reaches the end of the communication pipe 60 in the main tank 10, it is possible to prevent fuel vapor from being discharged from the main tank 10 through the first pressure relief pipe 51 at the time of refueling, so that the occurrence of overfilling is prevented.

(3) The transfer pump module 21 is stopped when the liquid level of fuel reaches the predetermined second amount, which is less than or equal to the remaining amount at which the liquid level of fuel in the main tank 10 reaches the end of the communication pipe 60. Therefore, it is possible to prevent the liquid level of fuel from reaching the end of the first pressure relief pipe 51 due to the transfer of fuel from the main tank 10 to the auxiliary tank 20.

(4) In the scavenging pipe 41, the block valve 80 is located at a portion that is closer to the canister 40 than the portion from which the first pressure relief pipe 51 branches off and closer to the canister 40 than the portion from which the second pressure relief pipe 53 branches off. Therefore, by closing the block valve 80 at the time of purging, the canister 40 is disconnected from both the main tank 10 and the auxiliary tank 20 simultaneously, so that both the main tank 10 and the auxiliary tank 20 are sealed.

The first embodiment may be modified as follows.

In the first embodiment, each time the remaining amount of fuel in the main tank 10 becomes less than or equal to the first predetermined amount, the controller 90 activates the transfer pump module 21 until the remaining amount of fuel in the main tank 10 reaches the second predetermined amount. In contrast, the transfer pump module 21 may be activated for a certain period of time each time the remaining amount of fuel in the main tank 10 becomes less than or equal to the first predetermined amount. Even in this case, since the pressure regulator is provided in the transfer pump module 21, when the liquid level of fuel in the main tank 10 reaches the end of the communication pipe 60 and the discharge of fuel vapor through the communication pipe 60 stops, the pressure in the transfer pipe 22 rises and the transfer of fuel to the main tank 10 is stopped. Therefore, even in this case, the liquid level of fuel from reaching the end of the first pressure relief pipe 51 due to the transfer of fuel.

Second Embodiment

A fuel tank system according to a second embodiment will now be described with reference to FIG. 6. The fuel tank system of the second embodiment has the same configuration as the fuel tank system of the first embodiment except for the configuration of the transfer device. Therefore, like or the same reference numerals are given to those components that are like or the same as the corresponding components of the first embodiment, and detailed explanations are omitted, and the configuration of the transfer device, which is different from the first embodiment, will be described in detail.

Figure 6:
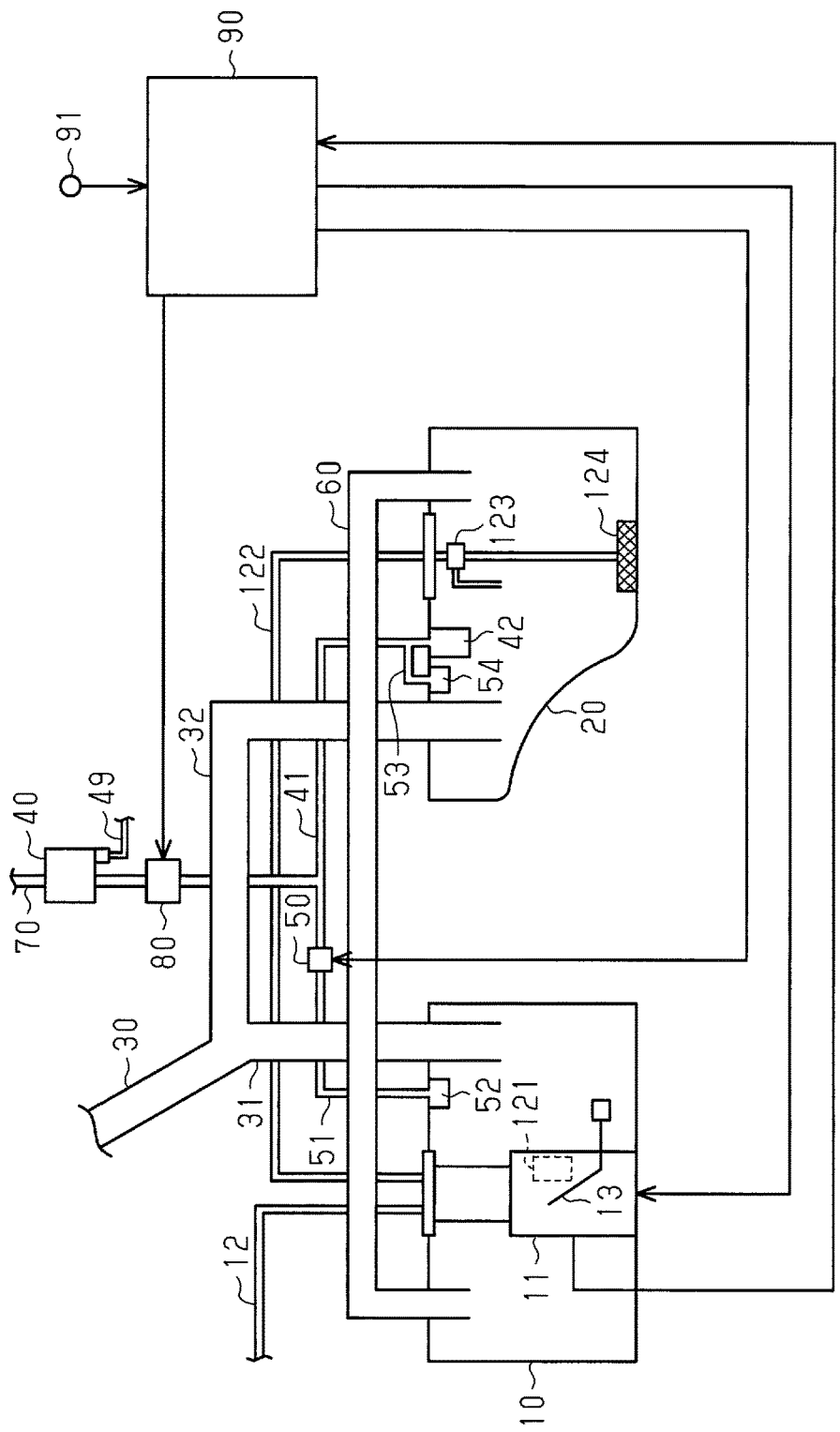
FIG. 6 is a schematic diagram showing the configuration of a fuel tank system according to a second embodiment.

FIG. 6 illustrates the fuel tank system of the second embodiment, in which the transfer device includes a jet pump 121, a transfer pipe 122, and a pressure regulator 123. The transfer pipe 122 extends from the jet pump 121 and is inserted into the auxiliary tank 20 to draw the fuel in the auxiliary tank 20. The pressure regulator 123 is provided in the transfer pipe 122. A suction filter 124 is provided at the end of the transfer pipe 122 that is located in the auxiliary tank 20.

The jet pump 121 is provided in the feed pump module 11 in the main tank 10. The fuel in the auxiliary tank 20 is drawn through the transfer pipe 122 by utilizing the momentum of flow of the fuel discharged from the pressure regulator of the feed pump module 11. The pressure regulator 123, which is provided in the transfer pipe 122, opens when the pressure in the transfer pipe 122 becomes higher than or equal to the valve opening pressure to discharge the fuel in the transfer pipe 122 into the auxiliary tank 20.

Next, the operation and advantages achieved by the operation of the fuel tank system according to the second embodiment will be described.

As in the case of the fuel tank system of the first embodiment, the pressure relief control valve 50 is kept closed at the time of refueling. Accordingly, while avoiding overfilling, the fuel tank system is capable of sending fuel vapor inside the main tank 10 and auxiliary tank 20 to the canister 40 through the scavenging pipe 41 and refueling the main tank 10 and the auxiliary tank 20 without discharging fuel vapor to the outside.

The feed pump module 11 constantly supplies more fuel than is consumed so that fuel insufficiently will not occur. Thus, while the feed pump module 11 is in operation, fuel is constantly discharged from the pressure regulator in the feed pump module 11. Therefore, in the fuel tank system according to the second embodiment, the fuel in the auxiliary tank 20 is drawn by the jet pump 121 while the feed pump module 11 is in operation.

Therefore, when the state continues in which the amount of fuel consumed is less than the amount of fuel transferred from the auxiliary tank 20 by the jet pump 121, the liquid level of fuel in the main tank 10 continues to rise. When the liquid level of fuel in the main tank 10 reaches the end of the communication pipe 60 in the main tank 10, the communication pipe 60 is blocked, so that the pressure in the main tank 10 rises. Fuel is thus unlikely to enter the main tank 10. As a result, the pressure in the transfer pipe 122 rises, so that fuel is discharged from the pressure regulator 123 into the auxiliary tank 20, and the transfer of fuel to the main tank 10 is stopped. Therefore, even in the fuel tank system of the second embodiment, it is possible to prevent the liquid level from reaching the end of the first pressure relief pipe 51 due to the transfer of fuel from the main tank 10 to the auxiliary tank 20.

As described above, the fuel tank system according to the second embodiment also has the transfer device. Thus, as in the case of the fuel tank system of the first embodiment, when the fuel in the main tank 10 is consumed, fuel can be transferred from the auxiliary tank 20 to the main tank 10 by the transfer device. Therefore, there is no need to provide a pipe connecting the lower part of the main tank 10 to the lower part of the auxiliary tank 20, like the balance pipe for equalizing the liquid levels of fuel of the main tank 10 and the auxiliary tank 20. Thus, the positions of the tanks 10, 20 are unlikely to be restricted by the arrangement of components. The fuel tank system of the second embodiment also executes purging during the operation of the internal combustion engine. During the purging, the controller 90 closes the block valve 80.

The second embodiment achieves the same advantages as the first embodiment. Also, in addition to the above-described advantages (1), (2), and (4), the following advantages are achieved.

(5) Without providing a pump module in the auxiliary tank 20, fuel can be transferred from the auxiliary tank 20 to the main tank 10 by utilizing the momentum of flow of fuel generated by the activation of the feed pump module 11.

(6) While the feed pump module 11 is in operation, the fuel in the auxiliary tank 20 is drawn by the jet pump 121. However, when the liquid level of fuel in the main tank 10 reaches the end of the communication pipe 60 in the main tank 10, the communication pipe 60 is blocked so that fuel is discharged from the pressure regulator 123 into the auxiliary tank 20, which stops the transfer of fuel to the main tank 10. Therefore, control by the controller 90 based on the remaining amount of fuel in the main tank 10 is not required, and it is possible to prevent the liquid level from reaching the end of the first pressure relief pipe 51 due to the transfer of fuel from the main tank 10 to the auxiliary tank 20.

The above-described embodiments may be modified as follows.

The pressure relief control valve is not limited to the normally open electromagnetic valve as in each of the above embodiments but may be any valve as long as it is configured to limit the flow of fuel vapor through the first pressure relief pipe 51. The pressure relief control valve may be, for example, a normally closed electromagnetic valve that opens when energized. Also, the pressure relief control valve does not have to be electrically driven like an electromagnetic valve.

Figure 7:
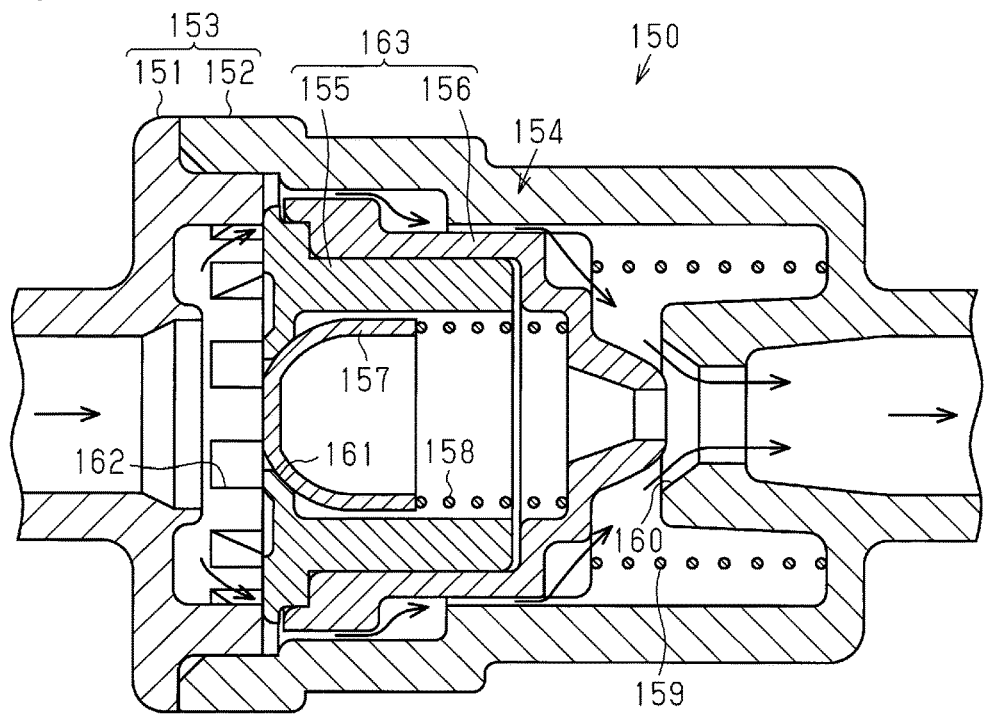
FIG. 7 is a cross-sectional view of a pressure relief control valve according to a modification in an open state.

The pressure relief control valve may be a valve that is closed by the action of the pressure in the main tank 10 as shown in FIG. 7. A pressure relief control valve 150 shown in FIG. 7 is provided in the first pressure relief pipe 51 instead of the pressure relief control valve 50. The pressure relief control valve 150 includes a housing 153, which is constituted by an upstream part 151 and a downstream part 152, and a primary valve member 154, which is accommodated in the housing 153 and urged by a spring 159.

The downstream part 152 is a tubular part having a passage for fuel vapor in the center. The plate-shaped upstream part 151 with a hole in the center is fitted in the downstream part 152. The housing 153 incorporates a seat portion 160, with which the primary valve member 154 comes into contact when the primary valve member 154 is closed. The primary valve member 154 is separated from the seat portion 160 by the urging force of the spring 159, which is accommodated between the primary valve member 154 and the downstream part 152.

The primary valve member 154 is configured by accommodating a secondary valve member 157 in a housing 163 that is constituted by combining a tubular upstream part 155 and a tubular downstream part 156. The secondary valve member 157 is urged toward the upstream part 155 by a spring 158 accommodated in the housing 163 and seated on the seat portion 161 provided in the upstream part 155.

The primary valve member 154, which is urged by the urging force of the spring 159, is in contact with the upstream part 151. The upstream part 151 has grooves 162 in the portion that contacts the primary valve member 154. As indicated by the arrows in FIG. 7, the fuel vapor flowing through the first pressure relief pipe 51 passes around the primary valve member 154 via the grooves 162 and flows downstream of the pressure relief control valve 150 through the clearance between the primary valve member 154 and the seat portion 160.

Figure 8:
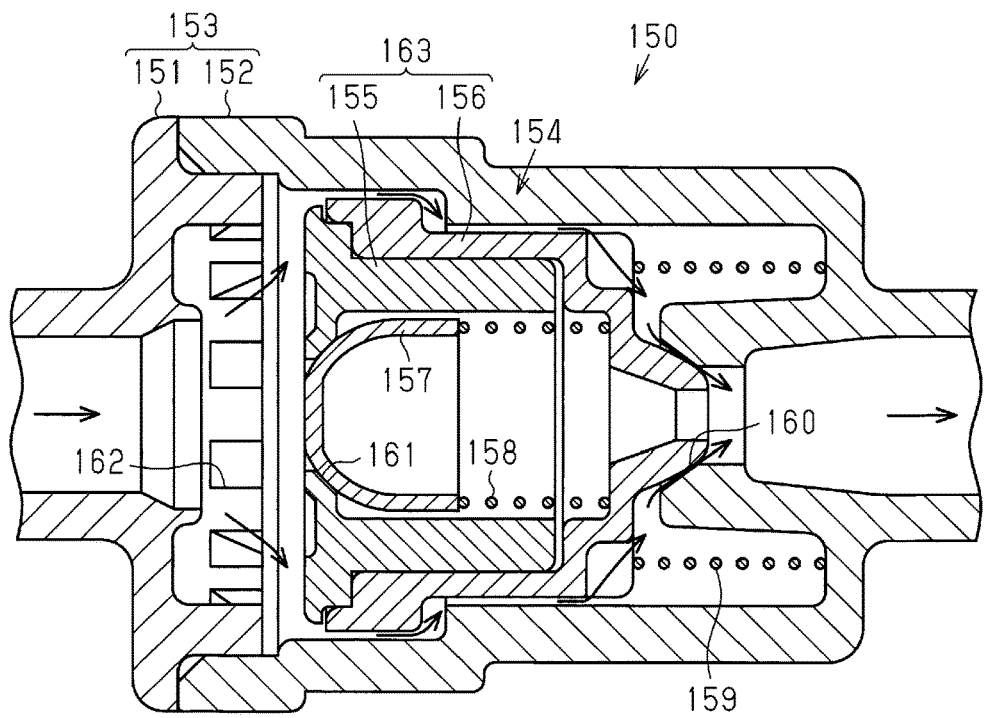
FIG. 8 is a cross-sectional view of the pressure relief control valve according to the modification in a closed state.

As shown in FIG. 8, in the pressure relief control valve 150, the liquid level of fuel in the main tank 10 rises at the time of refueling and the end of the communication pipe 60 in the main tank 10 is blocked by the surface of the fuel. When the pressure in the main tank 10 rapidly rises, the primary valve member 154 comes into contact with the seat portion 160 against the urging force of the spring 159, so that the pressure relief control valve 150 is closed. In the pressure relief control valve 150, even when the primary valve member 154 is in contact with the seat portion 160, a slight clearance exists between the primary valve member 154 and the seat portion 160. Therefore, when the pressure relief control valve 150 is closed, although fuel vapor flows downstream as indicated by the arrows, the flow of the fuel vapor is significantly limited as compared with the case where the valve 150 is open.

In this manner, the pressure relief control valve 150 is closed and the scavenging of fuel vapor through the first pressure relief pipe 51 is significantly restricted, so that fuel is unlikely to enter the main tank 10, which prevents the occurrence of overfilling as in the above-illustrated embodiments. By providing such a pressure relief control valve that is closed by the action of the pressure in the main tank 10, it is possible to prevent the occurrence of overfilling without requiring control by the controller 90.

Figure 9:
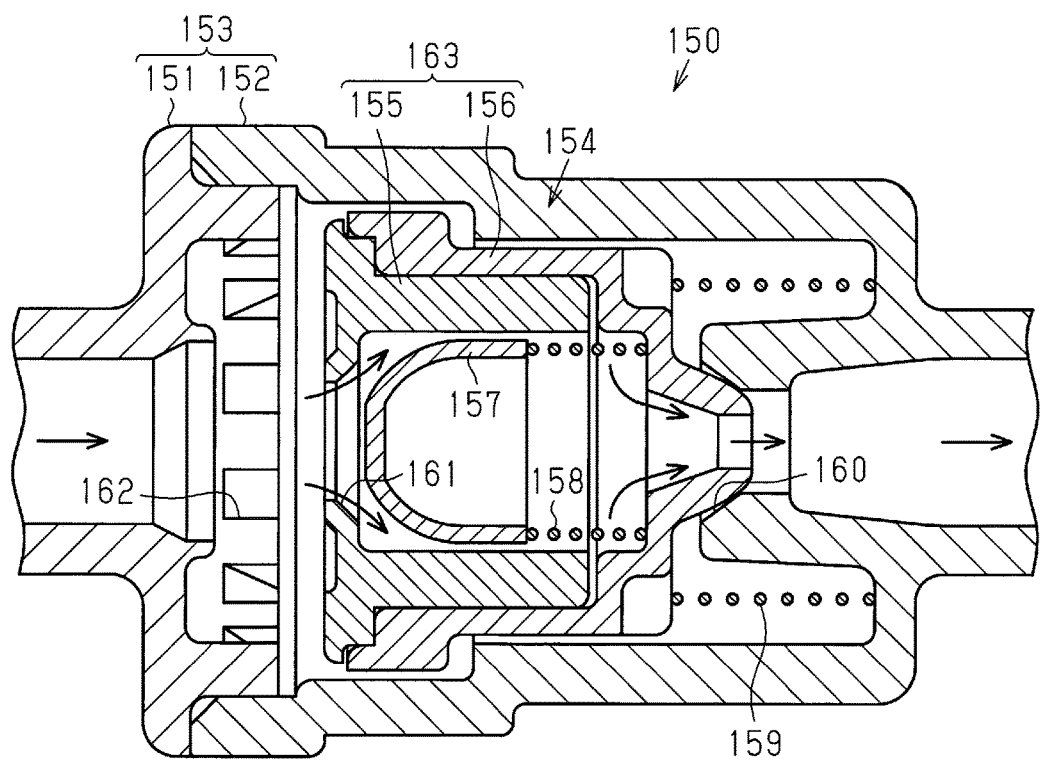
FIG. 9 is a cross-sectional view of the pressure relief control valve with the secondary valve member in an open state.

As shown in FIG. 9, in the pressure relief control valve 150, when the primary valve member 154 is closed and the pressure in the main tank 10 becomes excessively high, the secondary valve member 157 is separated from the seat portion 161 and opened. Therefore, the secondary valve member 157 functions as a safety valve that prevents the pressure in the main tank 10 from becoming excessively high.

Each of the above-illustrated embodiments is a fuel tank system having two tanks. However, a similar configuration may be employed in a fuel tank system having three or more tanks. Specifically, in a fuel tank system in which two or more auxiliary tanks are connected to the main tank 10, the scavenging pipe 41, which has the ORVR valve 42, is connected to the most downstream auxiliary tank that is filled with fuel at the end of refueling. The other auxiliary tanks are connected to a pressure relief pipe that branches off from a portion of the first pressure relief pipe 51 between the pressure relief control valve and the main tank 10 and has a cut-off valve. Even in such a fuel tank system, if the tanks are connected together by the communication pipe 60, and the height relationship of the ends of the scavenging pipe 41, the communication pipe 60, and the pressure relief pipe is the same as those in the above-illustrated embodiments, it is possible to supply fuel to each tank while preventing overfilling.

In each of the above-illustrated embodiments, the remaining amount of fuel is detected by the fuel sender gauge 13. The remaining amount of fuel can also be estimated from the integrated fuel injection amount from the state where the tanks are filled up. The state in which the tanks are filled up refers to a state in which supply of fuel to the main tank 10 and the auxiliary tank 20 is completed and the introduction of fuel is stopped.

The controller of the internal combustion engine may also function as the controller of the fuel tank system. In this case, the controller of the internal combustion engine controls the block valve 80, the pressure relief control valve 50, the feed pump module 11, and the transfer pump module 21.

Therefore, the present examples and embodiments are to be considered as illustrative and not restrictive and the invention is not to be limited to the details given herein, but may be modified within the scope and equivalence of the appended claims.

The invention claimed is:

1. A fuel tank system comprising:
   a feed pump module configured to draw fuel and supply the fuel;
   a controller configured to control the feed pump module;
   a main tank that accommodates the feed pump module;
   an auxiliary tank;
   a fuel introduction pipe that has a first branch pipe and a second branch pipe, wherein
      the first branch pipe has an end inserted into the main tank from above and is configured to supply the fuel to the main tank,
      the second branch pipe has an end inserted into the auxiliary tank from above and is configured to supply the fuel to the auxiliary tank,
      the fuel introduction pipe is configured such that fuel supply to the main tank through the first branch pipe is switched to fuel supply to the auxiliary tank when the main tank is filled with the fuel;
   a transfer device configured to draw fuel in the auxiliary tank and transfer the fuel to the main tank;
   a communication pipe that connects the main tank and the auxiliary tank to each other, the communication pipe having an end that is inserted into the main tank from above and an end that is inserted into the auxiliary tank from above;
   a canister that collects fuel vapor;
   a scavenging pipe that connects the canister and the auxiliary tank to each other;
   an ORVR valve, the ORVR valve being a float type valve provided at an end of the scavenging pipe located in the auxiliary tank, wherein the ORVR valve is configured to close when a liquid level of fuel reaches the ORVR valve, thereby limiting scavenging of fuel vapor from the auxiliary tank to the canister;
   a first pressure relief pipe that branches off from the scavenging pipe and has an end inserted into the main tank, wherein the first pressure relief pipe has a flow resistance of fuel vapor greater than those of the scavenging pipe and the communication pipe;
   a first cut-off valve that is a float type valve provided at the end of the first pressure relief pipe, wherein the first cut-off valve is configured to close when the liquid level of fuel reaches the first cut-off valve;
   a second pressure relief pipe that branches off from the scavenging pipe and has an end inserted into the auxiliary tank, wherein the second pressure relief pipe has a flow resistance of fuel vapor greater than that of the scavenging pipe;
   a second cut-off valve that is a float type valve provided at an end of the second pressure relief pipe, wherein the second cut-off valve is configured to close when the liquid level of fuel reaches the second cut-off valve; and
   a pressure relief control valve that is provided in the first pressure relief pipe, wherein the pressure relief control valve is configured to close to limit a flow of fuel vapor through the first pressure relief pipe, wherein
   in the main tank:
      the end of the communication pipe is located at a position higher than the end of the fuel introduction pipe inserted into the main tank from above, and
      the end of the first pressure relief pipe at which the first cut-off valve is provided is located at a position higher than the end of the communication pipe, and
   in the auxiliary tank:
      the end of the communication pipe is located at a position higher than the end of the fuel introduction pipe inserted into the auxiliary tank, and
      the end of the second pressure relief pipe at which the second cut-off valve is provided is located at a position higher than an end of the scavenging pipe,
   wherein when refueling is started, due to supplying the fuel to the main tank, the fuel vapor is introduced from the end of the communication pipe located at a position higher than an end of the first branching pipe and is sent to the canister through the scavenging pipe in the auxiliary tank, and
   wherein when the fuel in the main tank reaches the end of the communication pipe in the main tank and the fuel blocks the end of the communication pipe in the main tank, fuel supplying to the main tank is stopped and the fuel is supplied to the auxiliary tank through the second branching pipe, and the controller is configured to maintain the first pressure relief pipe in a closed state while refueling is performed.

2. The fuel tank system according to claim 1, wherein the pressure relief control valve is a valve that is closed by an action of a pressure in the main tank.

3. The fuel tank system according to claim 1, wherein the transfer device includes a transfer pump module, which is provided in the auxiliary tank, and a transfer pipe, which introduces, into the main tank, fuel that has been drawn by the transfer pump module, and the controller is configured to activate the transfer pump module when a remaining amount of fuel in the main tank becomes less than or equal to a first predetermined amount.

4. The fuel tank system according to claim 3, wherein the controller is configured to, when the remaining amount fuel in the main tank becomes less than or equal to the first predetermined amount, activate the transfer pump module until the remaining amount of fuel in the main tank becomes a second predetermined amount, which is greater than the first predetermined amount and is less than or equal to a remaining amount at which the liquid level of fuel reaches the end of the communication pipe in the main tank.

5. The fuel tank system according to claim 1, wherein the transfer device includes a jet pump, which is provided in the feed pump module, a transfer pipe, which extends from the jet pump and is inserted into the auxiliary tank to draw fuel in the auxiliary tank, and a pressure regulator, which is provided in the transfer pipe and is configured to, when a pressure in the transfer pipe becomes higher than or equal to a predetermined pressure, open to discharge fuel in the transfer pipe into the auxiliary tank.

6. The fuel tank system according to claim 1, further comprising a block valve, which is configured to be controlled by the controller and close to block the scavenging pipe, wherein the block valve is located at a portion of the scavenging pipe that is closer to the canister than a portion to which the first pressure relief pipe is connected and closer to the canister than a portion to which the second pressure relief pipe is connected.

7. The fuel tank system according to claim 1, wherein the ORVR valve, the first cut-off valve and the second cut-off valve are each distinct components located at different locations within the fuel tank system.

8. The fuel tank system according to claim 1, wherein the second cut-off valve and the ORVR valve are attached to a ceiling of the auxiliary tank, and a bottom of a housing of the second cut-off valve is located at a position higher than the a bottom of a housing 43 of the ORVR valve.

* * * * *